(12) United States Patent
Cheng et al.

(10) Patent No.: US 10,976,643 B1
(45) Date of Patent: Apr. 13, 2021

(54) MINI BOXLIKE STUDIO

(71) Applicants: Li-Chieh Cheng, New Taipei (TW); Sz Ying Chen, New Taipei (TW)

(72) Inventors: Li-Chieh Cheng, New Taipei (TW); Sz Ying Chen, New Taipei (TW)

( * ) Notice: Subject to any disclaimer, the term of this patent is extended or adjusted under 35 U.S.C. 154(b) by 0 days.

(21) Appl. No.: 16/581,708

(22) Filed: Sep. 24, 2019

(51) Int. Cl.
*G03B 15/07* (2021.01)
*G03B 15/00* (2021.01)

(52) U.S. Cl.
CPC .............. *G03B 15/00* (2013.01); *G03B 15/07* (2013.01)

(58) Field of Classification Search
CPC ........ G03B 15/00; G03B 15/02; G03B 15/06; G03B 17/48; G03B 17/56; G03B 15/07; E04H 3/22
USPC ............................................................ 396/1
See application file for complete search history.

(56) References Cited

U.S. PATENT DOCUMENTS

| | | | | |
|---|---|---|---|---|
| 5,475,460 A * | 12/1995 | Stephenson | ............ | G03B 15/00 396/1 |
| 5,828,908 A * | 10/1998 | Mauchan | ............... | G03B 15/06 396/2 |
| 7,680,401 B1 * | 3/2010 | Adelstein | ................. | A45C 9/00 396/1 |
| 9,513,537 B2 * | 12/2016 | Mun | ...................... | G03B 15/00 |
| 2005/0243538 A1 * | 11/2005 | Blanford | ................ | G03B 15/06 362/16 |
| 2013/0112149 A1 * | 5/2013 | Robbins | ............... | A01K 1/0114 119/166 |
| 2015/0344216 A1 * | 12/2015 | Petty | .................... | B65D 5/5021 206/589 |
| 2020/0128780 A1 * | 4/2020 | Noonan | ................. | B65D 5/322 |

* cited by examiner

*Primary Examiner* — Christopher E Mahoney (57) ABSTRACT

A mini boxlike studio comprises a background box including a cover and a box body; a supporting seat including at least one receiving cavity and a plurality of lateral plates around the receiving cavity for receiving assemblies about the studio; one of the plurality of lateral plates of the supporting seat being formed with a plurality of recesses for retaining assemblies used in a studio; wherein in storage, the supporting seat is placed within the background box; and the receiving cavity serves to receive the assemblies of the studio; and wherein in use, one surface of the background box is used as a background of the studio; and the recesses of the supporting seat are used to retain the assemblies of the studio.

12 Claims, 7 Drawing Sheets

MINI BOXLIKE STUDIO

FIELD OF THE INVENTION

The present invention is related to studios, and in particular to a mini boxlike studio.

BACKGROUND OF THE INVENTION

In the prior art, a studio must has a background, a stage, lighting lamps, and cameras. Actors are on the stage, and the background presents necessary sceneries. Lighting lamps provides necessary illumination, such as daytime, dark night, and various light effects. Then the cameras capture the images so as to form as a video. This video may be a short play, a puppet show, an opera, etc. However, a studio needs a large space and thus the cost is high, especially, if the studio is in a city.

Conventionally, a studio needs a large stage. Sometime, for necessity, a small studio may be provided for a performance which is unnecessary a large space. However, current, live broadcasts are more and more popular, while a live broadcast only has one actor and thus it does not need a large studio. Moreover, students or children may perform a short play, while conventionally, the studios with large spaces need great rents. The conventional studios are not suitable for current trends in performance and short plays. Therefore, the inventors of the present invention desires to have a novel structure which can improve the defects in the prior art and provides students and children to have cheap studios for playing or performance.

SUMMARY OF THE INVENTION

Accordingly, for improving above mentioned defects in the prior art, the object of the present invention is to provide a mini boxlike studio, wherein in the present invention, the background box, supporting seat and the support plates are combined to form a mini studio which is foldable for storage. The inner and outer surfaces of the background box of the present invention have different colors for the further image processing. In use, the inner side of the cover of the background box is used as a background of the studio and relative assemblies are arranged. Furthermore the supporting seat may be combined with the background box or be separated from the background box. Cameras and lighting lamps may be arranged on the supporting seat so as to illuminate the studio and take pictures of the studio. The supporting plates are used to support the cover which is opened from the box body. In storage, the supporting seat, supporting plates and relative assemblies of the studio are placed in the background box for storage. Therefore, the present invention provides many applications which are suitable for a studio in usage or in storage. The present invention also provides an easy way to store them. By the present invention, the studio is formed in a very small space for being storage easily and conveniently. In use, it is only needed to arrange them properly, so that a mini studio is formed. The cost of the present invention is cheap. The operations of assembly and expansion of the present invention are easy, convenient and quick, while these cannot be achieved by any prior art.

To achieve above object, the present invention provides a mini boxlike studio comprises a background box including a cover and a box body; a supporting seat including at least one receiving cavity and a plurality of lateral plates around the receiving cavity for receiving assemblies about the studio; one of the plurality of lateral plates of the supporting seat being formed with a plurality of recesses for retaining assemblies used in a studio; wherein in storage, the supporting seat is placed within the background box; and the receiving cavity serves to receive the assemblies of the studio; and wherein in use, one surface of the background box is used as a background of the studio; and the recesses of the supporting seat are used to retain the assemblies of the studio.

Furthermore the supporting seat includes a bottom plate extending from a lateral side of the supporting seat, and the bottom plate is expandable outwards so as to extend from another portion of the supporting seat.

The bottom plate is bendable to cause a part of the bottom plate to be placed within a bottom surface of the box body; as a result, the supporting seat and the box body are formed as an integral body; and the bottom plate of the supporting seat is used as a stage of the studio.

In use, the bottom plate of the supporting seat is bent to support the supporting seat to be in a standing state; the supporting seat is not connected to the box body; and the supporting seat may be arranged to be far away from the box body.

Recesses at one lateral plate of the supporting seat are assembled with different assemblies for auxiliary functions of the studio; a camera is inserted into one of the recess at the lateral plate for retaining a camera; illumination lamps are inserted into the recesses at two ends of the lateral plate.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 3:
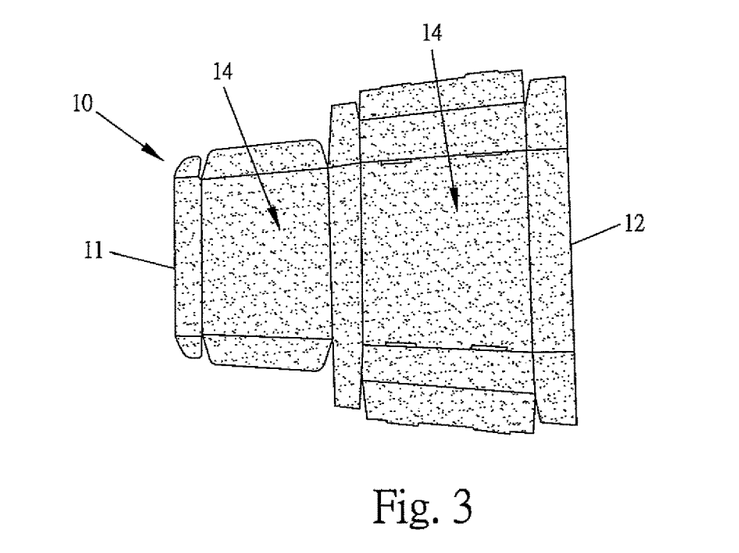
FIG. 3 is an expanded schematic view about the background box of the present invention.

A small boxlike studio is shown in FIGS. 1 to 13. The studio includes:

A background box 10 includes a cover 11 and a box body 12. In use, one side of the background box 10 is used as a background of a studio. Preferably, as illustrated in FIG. 3, the box body 12 and the cover 11 are expandable as a plane for storage. In use, they are assembled as the background box 10. The expansion of the box body 12 and the cover 11 as a plane is known in the prior art and thus the details will not be further described herein.

Figure 1:
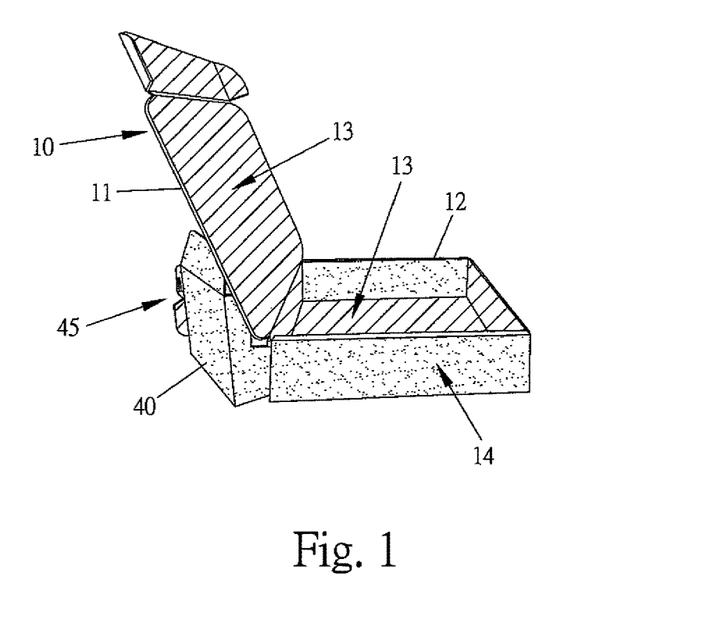
FIG. 1 is a schematic view about the background box of the present invention.
Figure 2:
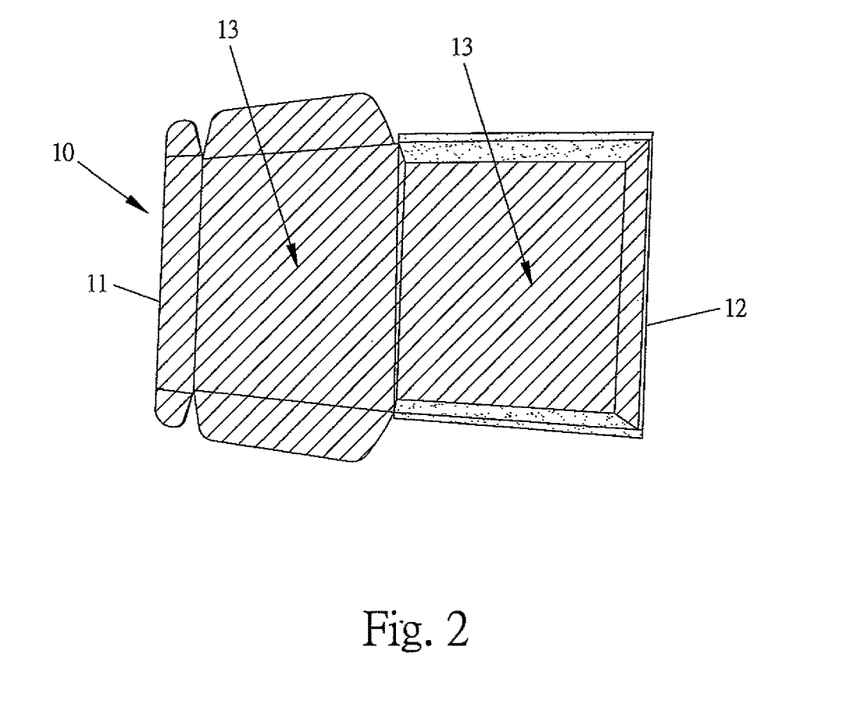
FIG. 2 is another schematic view about the background box of the present invention.

An inner surface 13 and an outer surface 14 of the background box 10 have different colors and textures (referring to FIGS. 1 and 2) so as to present different background. Preferably, the cover 11 is used as a background of the studio. As illustrated in FIG. 1, as the cover 11 is used as a background, the cover 11 is opened and an angle is formed between the cover 11 and the box body 12. Other portion of the background box 10 is used as a seat for supporting the cover 11. Preferably, each of the inner surface 13 and the outer surface 14 are a single color surface. The color of the inner surface 13 and the color of the outer surface 14 are different, for example, one has a green color and the other has a blue color, which are helpful in the succeeding image processing.

Figure 4:
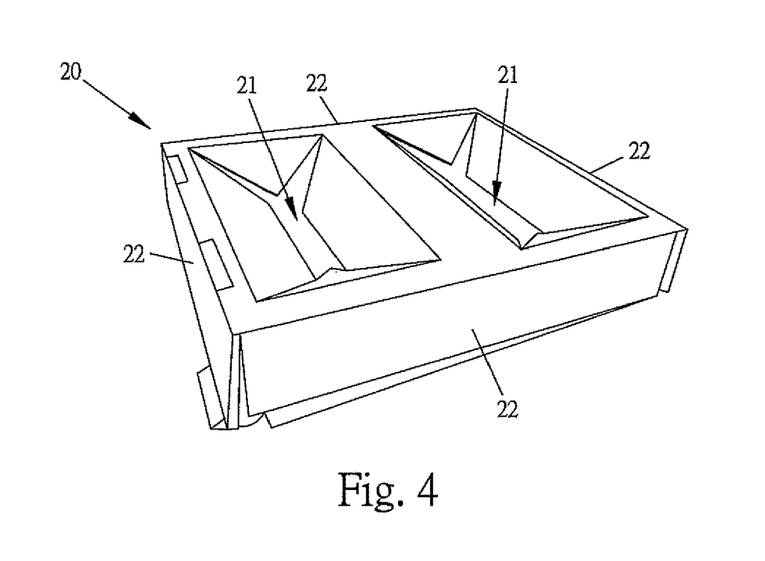
FIG. 4 is a schematic view about the supporting seat of the present invention.

A supporting seat 20 includes at least one receiving cavity 21 and a plurality of lateral plates 22 around the receiving cavity 21 for receiving assemblies about the studio of the present invention. FIG. 4 shows that the supporting seat 20 has two receiving cavities 21, one is at right side and another is at left side.

Figure 5:
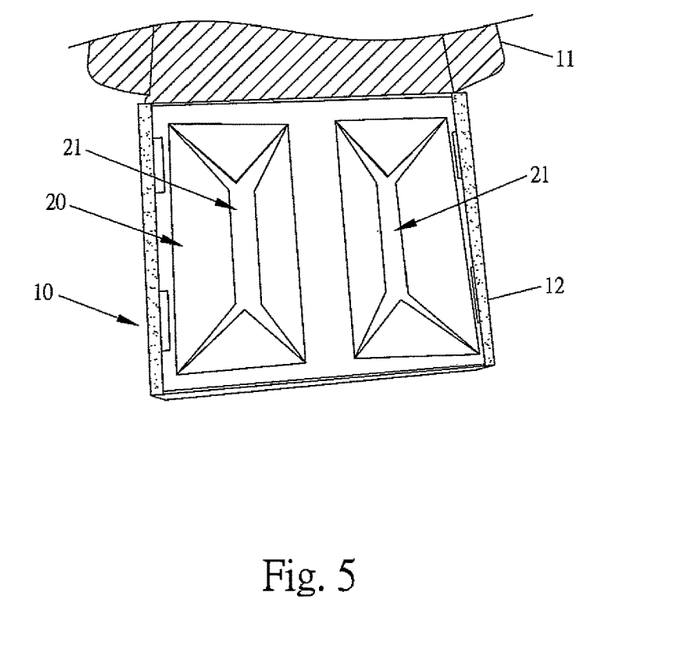
FIG. 5 is a schematic view showing that the supporting seat is placed into the box body.

Referring to FIG. 5, in storage, the supporting seat 20 is placed within the box body 12. The receiving cavities 21 of the supporting seat 20 serves to receive relative assemblies 30 about the studio of the present invention (referring to FIG. 6) for achieving the object of storage.

Figure 6:
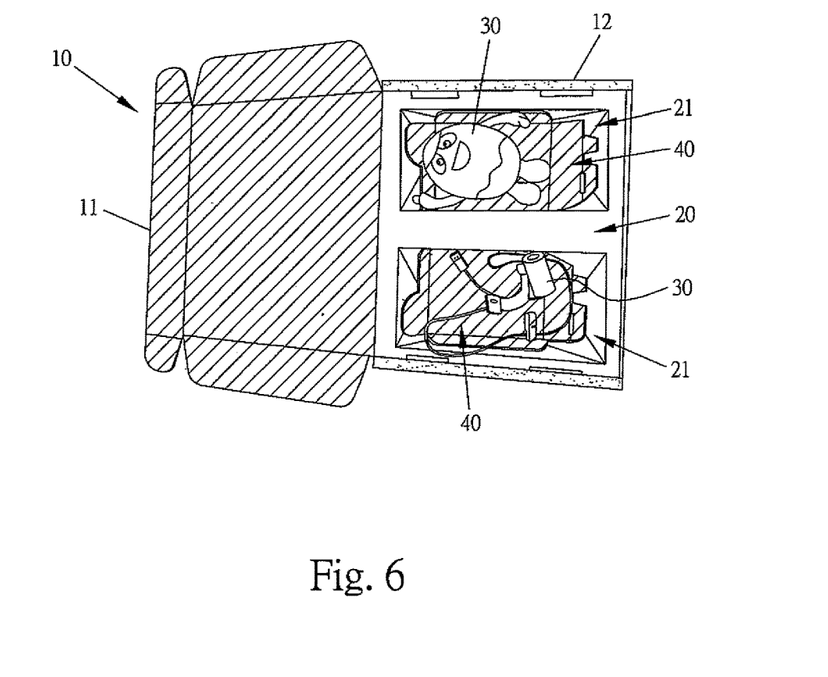
FIG. 6 is a schematic view showing the supporting seat receives different assemblies.

One lateral plate 22 of the supporting seat 20 is formed with a plurality of recesses 23 for fixed the assemblies 30 necessary for a studio of the present invention.

Figure 7:
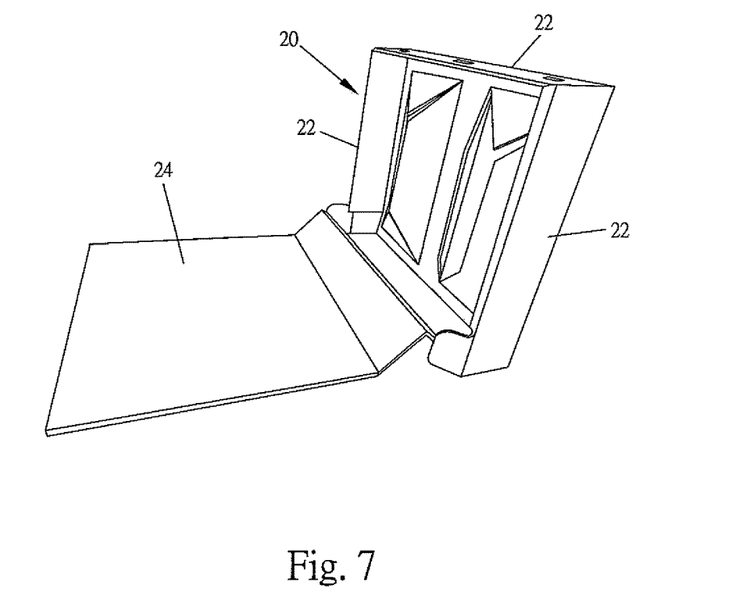
FIG. 7 is a schematic view showing that the supporting seat of the present invention stands.
Figure 8:
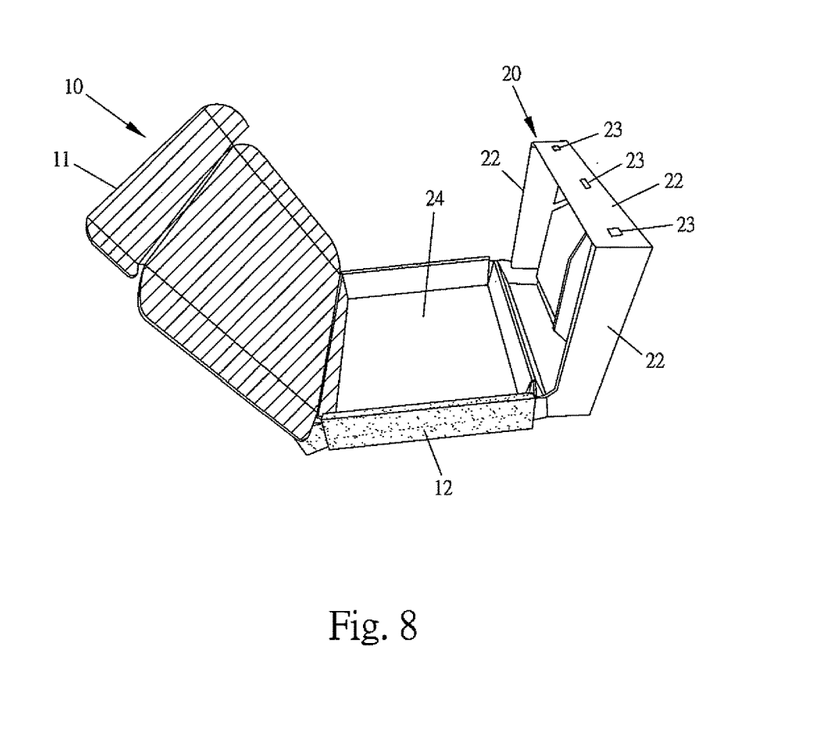
FIG. 8 is a schematic view showing the combination of the box body and the supporting seat.

Furthermore the supporting seat 20 includes a bottom plate 24 extending from a lateral side of the supporting seat 20, as illustrated in FIG. 7. The bottom plate 24 is expandable outwards so as to extend from other portion of the supporting seat 20, as shown in FIG. 8. In use, the bottom plate 24 may be bent properly to cause a part of the bottom plate 24 to be placed within the bottom surface of the box body 12. As a result, the supporting seat 20 and the box body 12 are formed as an integral body.

Figure 9:
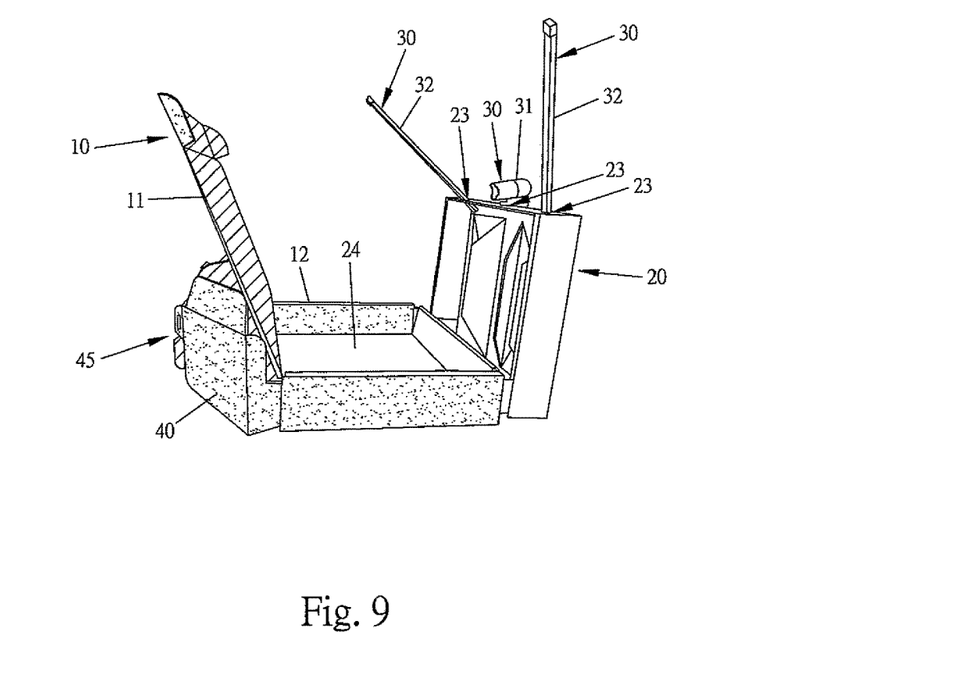
FIG. 9 is a schematic view showing the assemblies inserts into the recess of the supporting seat.

With reference to FIG. 9, recesses 23 at one lateral plate 22 of the supporting seat 2 are assembled with different assemblies 30 for auxiliary the functions of the studio. As illustrated in the drawing, a camera 31 is inserted into one of the recess 23 at the lateral plate 22 for retaining a camera 31. Illumination lamps 32 are inserted into the recesses 23 at two ends of the lateral plate 22.

See FIG. 9, in use of the mini studio of the present invention, when the bottom plate 24 of the supporting seat 20 is as a studio, an inner side of the cover 11 opened from the box body 12 is used a background of the studio. Then the two illumination lamps 32 serves to provide proper illumination so that the studio may have necessary illumination. Next, the camera 31 can take video in the whole studio to achieve the object of mini studio of the present invention.

Figure 10:
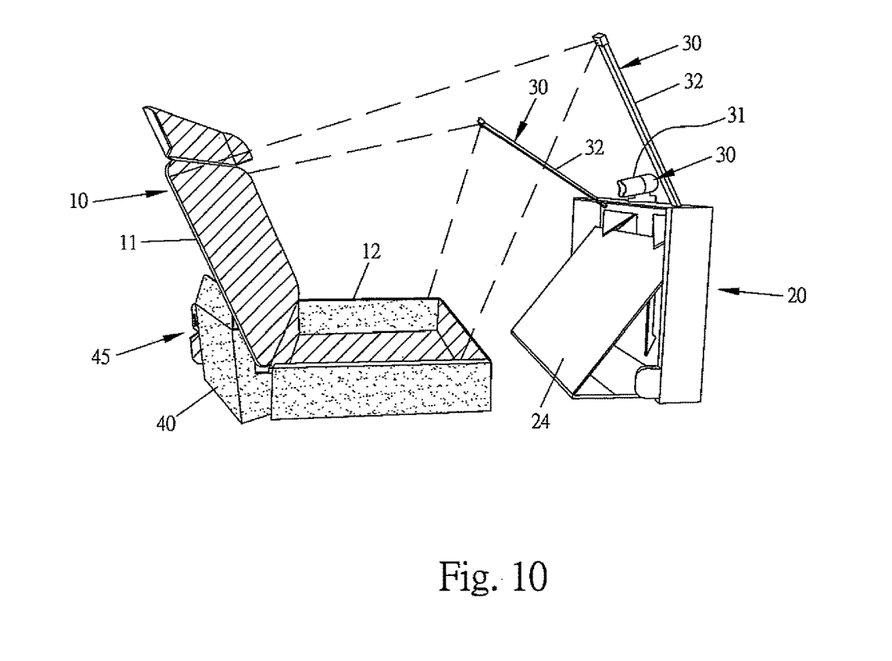
FIG. 10 is a schematic view showing that the supporting seat is arranged on an outer side of the box body.

With reference to FIG. 10, in use, the bottom plate 24 of the supporting seat 20 may be bent to support the supporting seat 20 to be in a standing state. Therefore, the supporting seat 20 is not connected to the box body 12. The supporting seat 20 may be arranged to be far away from the box body 12. Then the camera 31 is inserted into one of the recesses 23 of the lateral plate 22 and two illumination lamps 32 are inserted into other two recesses 23 of the same lateral plate 22. As a result, the whole structure is formed as a studio. However, in this application, the illumination lamps 32 have a longer distance from the studio.

Figure 11:
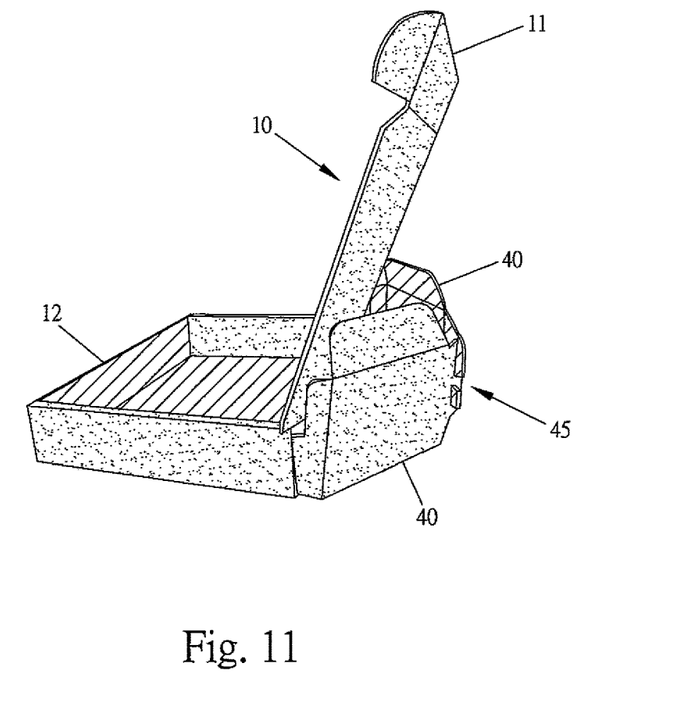
FIG. 11 is a schematic view showing that a support frame of a back plate supports the cover.
Figure 12:
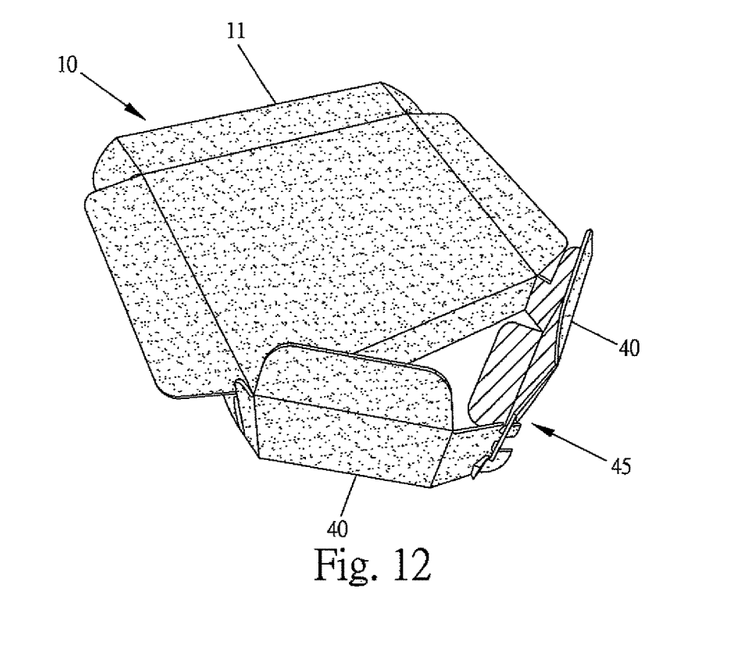
FIG. 12 is another schematic view showing that a support frame of a back plate supports the cover.
Figure 13:
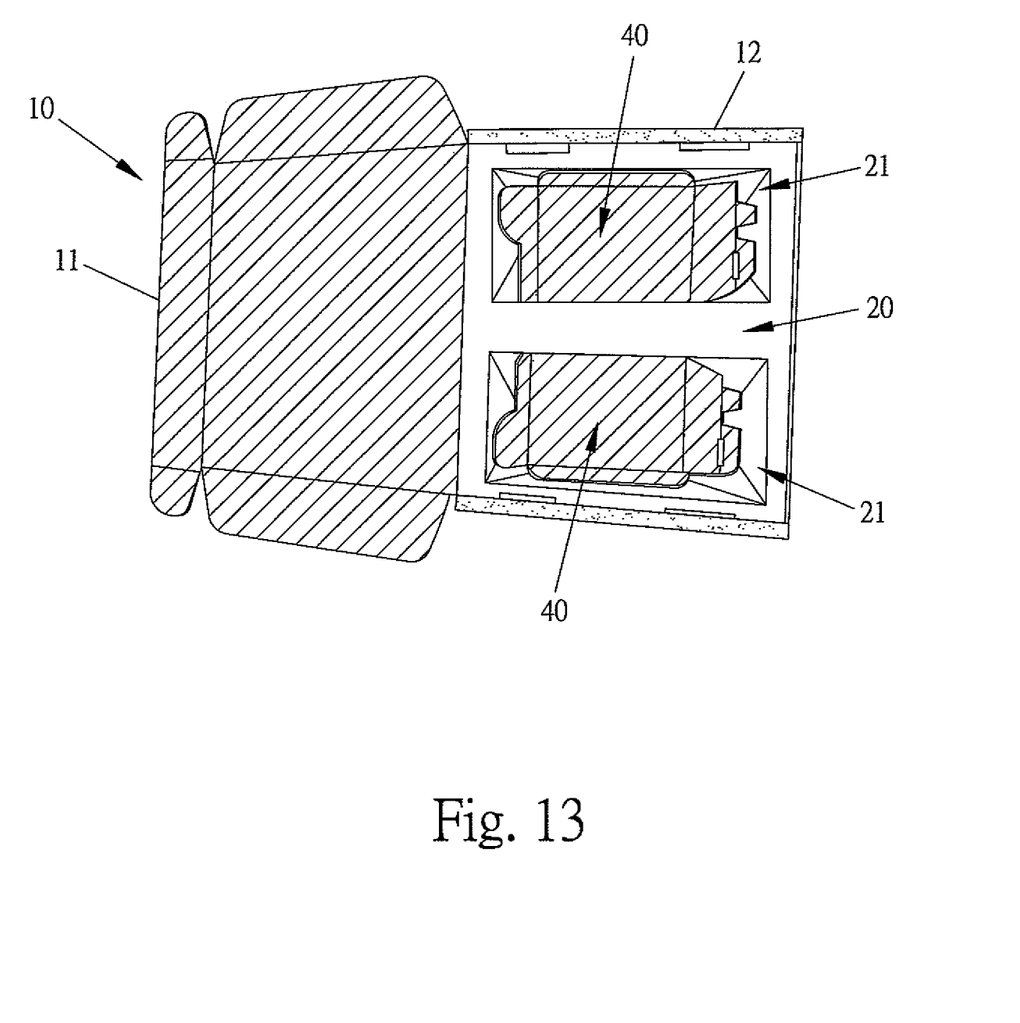
FIG. 13 is a schematic view showing a supporting plate of the present invention is arranged at an inner side of the background box.

The present invention further comprises at least one two supporting plates 40. The supporting plates 40 are arranged at an inner side of the background box 10 to be used as pads (referring to FIG. 13). In use, the two supporting plates 40 can be used to support the cover 11. The lateral sides of two supporting plates 40 are interlaced with one another and stands so as to form as a back support frame 45, as illustrated in FIGS. 11 and 12. When the cover 11 is opened, the back support frame 45 is placed at a backside of the cover 11 to support the cover 11 at a specific direction, while the inner side of the cover 11 is used as a background of the studio.

Advantages of the present invention will be described herein. In the present invention, the background box, supporting seat and the support plates are combined to form a mini studio which is foldable for storage. The inner and outer surfaces of the background box of the present invention have different colors for the further image processing. In use, the inner side of the cover of the background box is used as a background of the studio and relative assemblies are arranged. Furthermore the supporting seat may be combined with the background box or be separated from the background box. Cameras and lighting lamps may be arranged on the supporting seat so as to illuminate the studio and take pictures to the studio. The supporting plates are used to the cover which is opened from the box body. In storage, the supporting seat, supporting plates and relative assemblies of the studio are placed in the background box for storage. Therefore, the present invention provides many applications which are suitable for a studio in usage or in storage. The present invention also provides an easy way to store them. By the present invention, the studio is formed in a very small space for being storage easily and conveniently. In use, it is only needed to arrange them properly, so that a mini studio is formed. The cost of the present invention is cheap. The operations of assembly and expansion of the present invention are easy, convenient and quick, while these cannot be achieved by any prior art.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:
1. A mini boxlike studio, comprising:
a background box including a cover and a box body;
a supporting seat including at least one receiving cavity and a plurality of lateral plates around the receiving cavity for receiving assemblies about the studio; one of the plurality of lateral plates of the supporting seat being formed with a plurality of recesses for retaining assemblies used in a studio;
wherein in storage, the supporting seat is placed within the background box; and the receiving cavity serves to receive the assemblies of the studio; and wherein in use, one surface of the background box is used as a background of the studio; and the recesses of the supporting seat are used to retain the assemblies of the studio; and wherein the supporting seat includes a bottom plate extending from a lateral side of the supporting seat, the bottom plate is expandable outwards so as to extend from another portion of the supporting seat.

2. The mini boxlike studio as claimed in claim 1, wherein the supporting seat has two receiving cavities, one cavity is at a right side of the supporting seat and another cavity is at a left side of the supporting seat.

3. The mini boxlike studio as claimed in claim 1, wherein an inner surface and an outer surface of the background box have different colors and textures so as to present different backgrounds.

4. The mini boxlike studio as claimed in claim 1, wherein a color of the inner surface and a color of the outer surface are different, which are helpful in image processing.

5. The mini boxlike studio as claimed in claim 1, wherein one of an inner surface and an outer surface of the background box is green and the other is blue.

6. The mini boxlike studio as claimed in claim 1, wherein as the cover is used as a background, the cover is opened and an angle is formed between the cover and the box body and another portion of the background box is used as a seat for supporting the cover.

7. The mini boxlike studio as claimed in claim 1, wherein the bottom plate is bendable to cause a part of the bottom plate to be placed within a bottom surface of the box body; as a result, the supporting seat and the box body are formed as an integral body; and the bottom plate of the supporting seat is used as a stage of the studio.

8. The mini boxlike studio as claimed in claim 1, wherein in use, the bottom plate of the supporting seat is bent to support the supporting seat to be in a standing state; the supporting seat is not connected to the box body; and the supporting seat may be arranged to be far away from the box body.

9. The mini boxlike studio as claimed in claim 1, wherein recesses at one lateral plate of the supporting seat are assembled with different assemblies for auxiliary functions of the studio.

10. The mini boxlike studio as claimed in claim 1, further comprising at least two supporting plates; the supporting plates being arranged at an inner side of the background box to be used as pads.

11. The mini boxlike studio as claimed in claim 1, further comprising two supporting plates for supporting the cover; wherein the lateral sides of two supporting plates are interlaced with one another and stands so as to form as a back support frame; when the cover is opened, the back support frame is placed at a backside of the cover to support the cover at a predetermined direction, while the inner side of the cover is used as a background of the studio.

12. The mini boxlike studio as claimed in claim 1, wherein the box body and the cover is expandable as a plane for storage and they can be assembled as a background box.

* * * * *